(12) United States Patent
Nakamura (10) Patent No.: US 6,300,799 B1
(45) Date of Patent: Oct. 9, 2001

(54) SIGNAL LINE DRIVER HAVING REDUCED TRANSMISSION DELAY TIME AND REDUCED POWER CONSUMPTION

(75) Inventor: Hiroya Nakamura, Stafford, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/385,344

(22) Filed: Aug. 30, 1999

(30) Foreign Application Priority Data

Aug. 31, 1998 (JP) .................................................. 10-260884

(51) Int. Cl.$^7$ ....................... H03K 19/003; H03K 19/094
(52) U.S. Cl. ................................ 326/86; 326/30; 326/121
(58) Field of Search ................................. 326/17, 21, 30, 326/33, 81, 83, 86, 87, 121

(56) References Cited

U.S. PATENT DOCUMENTS

| | | | |
|---|---|---|---|
| 5,214,320 | * | 5/1993 | Troung .................................. 307/451 |
| 5,617,043 | * | 4/1997 | Han et al. ................................ 326/83 |
| 5,767,700 | * | 6/1998 | Lee ......................................... 326/86 |
| 6,040,715 | * | 3/2000 | Kang et al. ............................. 326/87 |
| 6,054,874 | * | 4/2000 | Sculley et al. .......................... 326/83 |
| 6,130,556 | * | 10/2000 | Schmitt et al. ........................ 326/81 |

* cited by examiner

Primary Examiner—Michael Tokar
Assistant Examiner—Vibol Tan
(74) Attorney, Agent, or Firm—William B. Kempler; Frederick J. Telecky, Jr.

(57) ABSTRACT

To reduce the power consumption and to shorten the transmission delay time in a signal line drive for the purpose of transmitting a binary signal. The NMOS transistors 10, 12 are respectively connected as driving switching elements between the transmission end of a complementary pair of bus lines (AL, AL_) and a terminal at the power supply voltage ($V_{SS}$) of a reference L level. The switching control circuit 14 for the purpose of controlling the ON☐OFF switching of the NMOS transistor 10 is constructed of the PMOS transistor 16, the NMOS transistor 18, the inverters 20, 22, the NAND gate 24, and the NOR gate 26. The switching control circuit 34 for the purpose of controlling the ON☐OFF switching of the NMOS transistor 12 is constructed of the PMOS transistor 36, the NMOS transistor 38, the inverter 40, the NAND gate 42, and the NOR gate 44. The PMOS transistors 46, 48 used as bias or as switching elements for the precharge are respectively connected between the transmission ends of both bus lines (AL, AL_) and a terminal at the power supply voltage ($V_{DD}$).

10 Claims, 4 Drawing Sheets

SIGNAL LINE DRIVER HAVING REDUCED TRANSMISSION DELAY TIME AND REDUCED POWER CONSUMPTION

FIELD OF INVENTION

The present invention relates to a signal line driver for the transmission and output of a binary signal such as a digital signal.

BACKGROUND OF INVENTION

For this type of a signal line driver, a bus driver, a line driver, etc. can be used.

Figure 6:
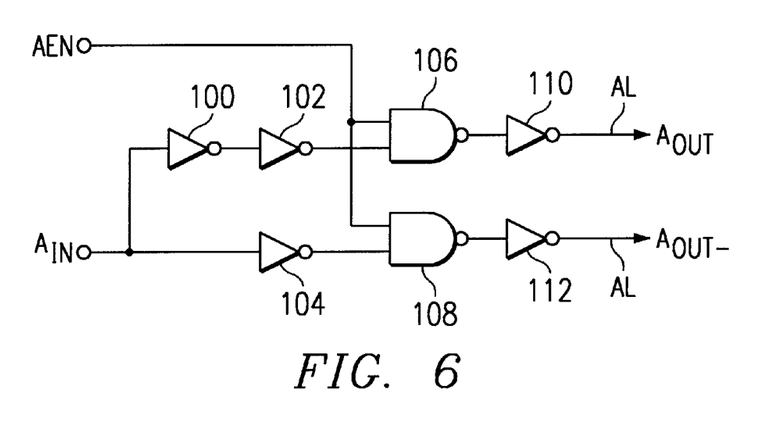
FIG. 6 is a circuit diagram showing the circuit construction of a conventional bus driver.
Figure 7:
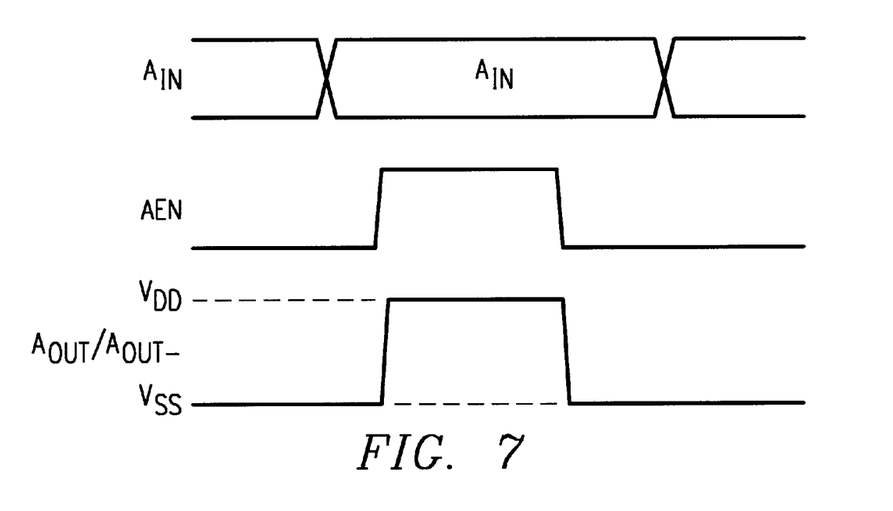
FIG. 7 is a timing chart showing the waveform of the signal for each section of a conventional bus driver.

FIG. 6 shows a circuit diagram for a conventional address driver that is used in an address buffer or the like within a semiconductor memory device. FIG. 7 shows the signal waveform of each section of this address driver.

This address driver is designed with a one bit address signal input (AIN), and a pair of complementary address signal outputs (AOUT, AOUT_) having either an H level or an L level in response to the logic value of this input address signal (AIN).

This address driver is constructed of input stage inverters 100, 102, 104 that regulate the voltage level of the input address signal (AIN) to the logic level of a reference voltage, NAND gates 106, 108 that regulate the pulse period of the output address signals (AOUT, AOUT_), and the output stage inverters 110, 112 that electrically drive the pair of bus lines (AL, AL_), respectively, in order to transmit the output address signals (AOUT, AOUT_). The other end (receive end) of the bus lines (AL, AL_) are connected at the receiver side, for example, to the input terminal of an input buffer for an address decoder or a receiver (not illustrated).

In the interval that the address signals (AOUT, AOUT_) are not output, the address enable signal (AEN) is in an inactive state (L level), the outputs of both NAND gates 106, 108 are each held at an H level, and the outputs of both inverters 110, 112 and the bus lines (AL, AL) are all held at an L level that is equal to the power supply voltage ($V_{SS}$) (for example, 0 volts).

At the same time an address signal (AIN) is input, an address enable signal (AEN) is activated for a prescribed period, for example, for the pulse period, and during this pulse period, both NAND gates 106, 108 are turned on.

When the logic level of the address signal (AIN) is "1" (H level), the output of the NAND gate 106 becomes an L level, and due to this, the output of the inverter 110 becomes an H level that is nearly equal to the power supply voltage ($V_{DD}$) (for example, 3.3 volts). On the other hand, the output of the NAND gate 108 remains at the H level, and the output of the inverter 112 remains at the L level that is equal to ($V_{SS}$). By this means, during the pulse period that is regulated by means of the address enable signal (AEN), an address signal (AOUT) having an H level that is nearly equal to ($V_{DD}$) is output on the bus line (AL); and a complementary address signal AOUT_) having an L level that is nearly equal to ($V_{SS}$) is output on the bus line AL_.

Conversely, when the logic value of the address signal (AIN) is "0" (L level), during the pulse period, an address signal (AOUT) having an L level that is nearly equal to ($V_{SS}$) is output on one of the bus lines (AL), and a complementary address signal (AOUT_) having an H level that is nearly equal to ($V_{DD}$) is output on the other bus line (AL_).

Problems to be solved by the invention

As was mentioned above, a conventional signal line driver of this type can transmit and output a binary signal having an H level that is nearly equal to ($V_{DD}$) and an L level that is nearly equal to ($V_{SS}$) due to the fact that the output stage inverters 110, 112 drive the signal lines (bus lines) AL, AL_ at the full amplitude of both power supply voltages ($V_{DD}$, $V_{SS}$).

However, in a DRAM (dynamic RAM), for example, as the storage capacity increases, the chip surface area also increases and the signal lines within the chip become longer, and the transmission delay time on the bus becomes impossible to ignore. Also, in a high-speed memory such as a synchronous DRAM, the transfer cycle for the signal is fast, and because as a general rule the address width (number of address bits) is also large, the electrical power that is consumed by the bus driver also becomes impossible to ignore.

The present invention was designed with consideration of these types of problems, and its purpose is to disclose a signal line driver that reduces the power consumption and shortens the transmission delay time.

SUMMARY OF THE INVENTION

In order to achieve the above-mentioned purposes, a first aspect of the present invention is a signal line driver that electrically drives a signal line for the purpose of transmitting a binary signal that has a bias means that holds the above-mentioned signal line at a first voltage level in the interval the above-mentioned binary signal is not being transmitted, a switching means that is connected between the above-mentioned signal line and a power supply voltage terminal that supplies a second voltage level, and a switch control means that holds the above-mentioned switching means in the OFF condition in the interval the above-mentioned binary signal is not being transmitted, conditionally switches the above-mentioned switching means to the ON condition in response to the logic value of the above-mentioned binary signal when the above-mentioned binary signal is being transmitted, and returns the above-mentioned switching means to the OFF condition when the voltage of the above-mentioned signal line reaches a prescribed voltage level.

Another aspect of the present invention is a signal line driver that electrically drives a first and second signal line complementarily in order to transmit one binary signal that has a first and second bias means that hold the above-mentioned first and second signal line respectively at a first voltage level in the interval the above-mentioned binary signal is not being transmitted, a first and second switching means that connects between the above-mentioned first and second signal lines respectively and a power supply voltage terminal that supplies a second voltage level, and a switch control means that holds the above-mentioned first and second switching means in the OFF condition in the interval the above-mentioned binary signal is not being transmitted, switches one of the above-mentioned first or second switching means to the ON condition in response to the logic value of the above-mentioned binary signal when the above-mentioned binary signal is being transmitted and holds the other in the OFF condition, and returns the above-mentioned switching means to the OFF condition when the voltage of the above-mentioned signal line that is connected to the above-mentioned switching means reaches a prescribed voltage level.

A third aspect of the invention is a signal line driver that electrically drives a signal line for the purpose of transmitting a binary signal in a pulse waveform that has a bias means that maintains the above-mentioned signal line at a first voltage level in the interval the above-mentioned binary signal is not being transmitted, a switching means that is connected between the above-mentioned signal line and a power supply voltage terminal that supplies a second voltage level, and a switch control means that holds the above-mentioned switching means in the OFF condition in the interval the above-mentioned binary signal is not being transmitted, conditionally switches the above-mentioned switching means to the ON condition in response to the logic value of the above-mentioned binary signal when the above-mentioned binary signal is being transmitted, and returns the above-mentioned switching means to the OFF condition when a prescribed period that is shorter than the pulse period has elapsed.

A fourth aspect of the invention is a signal line driver that electrically drives a first and second signal line complementarily for the purpose of transmitting a binary signal of a pulse waveform that has a first and second switching means that holds the above-mentioned first and second signal lines respectively at a first voltage level in the interval the above-mentioned binary signal is not being transmitted, a first and second switching means that are connected between the above-mentioned first and second signal lines respectively and a power supply voltage terminal that supplies a second voltage level, and a control means that holds the above-mentioned first and second switching means in the OFF condition in the interval the above-mentioned binary signal is not being transmitted, switches one of the above-mentioned first or second switching means to the ON condition in response to the logic value of the above-mentioned binary signal when the above-mentioned binary signal is being transmitted and holds the other in the OFF condition, and returns the above-mentioned switching means to the OFF condition when a prescribed period that is shorter than the pulse period has elapsed.

A fifth aspect of the invention is a signal line driver claimed in any one of Claims 1 to 4, characterized in that the above-mentioned bias means has a precharging switching means that is connected between each of the above-mentioned signal lines and the power supply voltage terminal that supplies the above-mentioned first voltage level, and a precharge control means that holds the above-mentioned precharging switching means in the ON condition in the interval the above-mentioned binary signal is not being transmitted, and holds the above-mentioned precharging switching means in the OFF condition when the above-mentioned binary signal is being transmitted.

REFERENCE NUMERALS AND SYMBOLS AS SHOWN IN DRAWINGS

2 Bus driver
4 Receiver
6 Timing circuit
10, 12 NMOS transistor used for the driver
14, 34 Switching control circuit
46, 48 PMOS transistor used for precharge
AL, AL__ Bus line

DESCRIPTION OF EMBODIMENTS

Below, application examples of the present invention are explained with reference to FIGS. 1 to 5.

Figure 1:
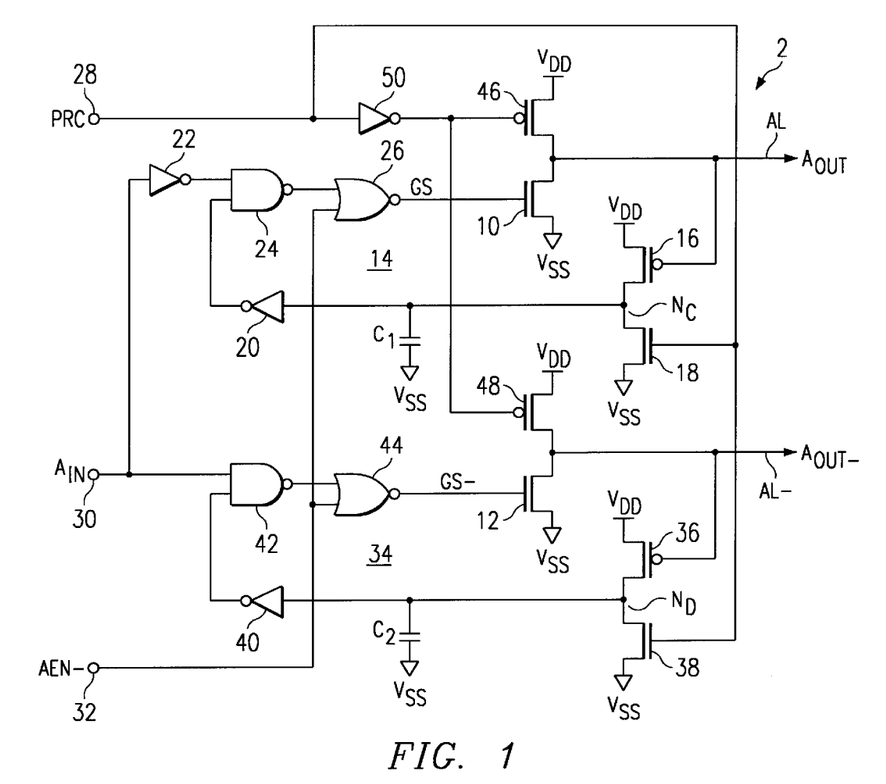
FIG. 1 is a circuit diagram showing the circuit construction or a bus driver according to one application example of the present invention.

In FIG. 1, a circuit diagram of a bus driver according to Application Example 1 of the present invention is shown. This bus driver, for example, is provided within an address buffer of a semiconductor memory device, and transmits a one bit address signal by means of a differential system.

Figure 2:
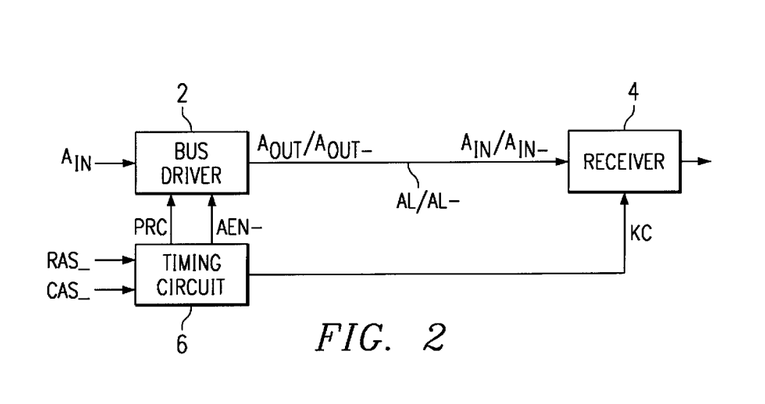
FIG. 2 is a block diagram showing the construction of an address signal transmission system in an application example.

As is shown in FIG. 2, this bus driver 2 is connected to a receiver, for example, a receiver 4 for an address decoder, via the pair of complementary bus lines AL, AL__. The bus driver 2 has a one bit address signal (AIN) input and in response to the logical value of this input address signal (AIN), outputs a complementary pair of address signals (AOUT, AOUT__) having the logic H level and L level on the transmit end of the bus lines AL, AL__. The receiver 4 receives the address signals (Ain, Ain__) which are equivalent to the address signals (AOUT, AOUT__) respectively from the bus driver 2 at the input side of the bus lines AL, AL__. The timing circuit 6 supplies the later explained timing signals (PRC, AEN__), and (KC), which will be explained below and are used to control the bus driver 2 and the receiver 4.

As shown in FIG. 1, in the bus driver 2 of this application example, the NMOS transistors 10, 12 used as switching transistors for the drivers are each connected between the transmit ends for both bus lines AL, AL__ respectively and a terminal at the power supply voltage ($V_{SS}$) (for example, 0 volts) for the reference L level.

A switching control circuit 14 that controls the switching of NMOS transistor 10 ON□OFF is constructed of a PMOS transistor 16, an NMOS transistor 18, an inverter 20, 22, a NAND gate 24, and a NOR gate 26.

More specifically, the source terminal of the PMOS transistor 16 is connected to the power supply terminal of the power supply voltage ($V_{DD}$) (for example, 3.3 volts) for the reference H level, and the source terminal of the NMOS transistor 18 is connected to a terminal at the power supply voltage ($V_{SS}$). The transmit end of the bus line AL is connected to the gate terminal of the PMOS transistor, and the precharge control signal input terminal 28 is connected to the gate terminal of the NMOS transistor 18.

The drain terminal (node (Nc)) of the PMOS transistor 16 and the NMOS transistor 18 are connected to the input terminal of the inverter 20. The output terminal of the inverter 20 is connected to one of the input terminals of the NAND gate 24. Also, the capacitor C1 is connected between the input terminal of the inverter 20 and a terminal at the power supply voltage ($V_{SS}$).

The pulse signal input terminal 30 is connected to the input terminal of the inverter 22, and the output terminal of the inverter 22 is connected to the other input terminal of the NAND gate 24.

The output terminal of the NAND gate 24 is connected to one of the input terminals of the NOR gate 26. The address enable input signal terminal 32 is connected to the other input terminal of the NOR gate 26. The output terminal of the NOR gate 26 is connected to the gate terminal of the NMOS transistor 10.

A switching control circuit 34 that controls the switching of NMOS transistor 12 ON☐OFF is constructed of a PMOS transistor 36, an NMOS transistor 38, an inverter 40, a NAND gate 42, and a NOR gate 44.

In greater detail, the source terminal of the PMOS transistor 36 is connected to a terminal at the power supply voltage ($V_{DD}$), and the source terminal of the NMOS transistor 38 is connected to a terminal at the power supply voltage ($V_{SS}$). The sending terminal of bus-line AL__ is connected to the gate terminal of PMOS transistor 36, and pre-charge control signal input terminal 28 is connected to the gate terminal of NMOS transistor 38.

The drain terminal (node(Nd)) of the PMOS transistor 36 and the NMOS transistor 38 are connected to the input terminal of the inverter 40. Also, the capacitor C2 is connected between the input terminal of the inverter 40 and a terminal at the power supply voltage ($V_{SS}$). The output terminal of the inverter 40 is connected to one of the input terminals of the NAND gate 42. The address signal input terminal 30 is connected to the other input terminal of the NAND gate 42.

The output terminal of the NAND gate 42 is connected to one of the input terminals of the NOR gate 44. The address enable signal input terminal 32 is connected to the other output terminal of the NOR gate 44. The output terminal of the NOR gate 44 is connected to the gate terminal of the NMOS transistor 12.

Also, the PMOS transistors 46, 48 used as switching elements for the bias and the precharging are each connected between the transmission ends for both bus lines AL, AL__ respectively and a terminal at the power supply voltage ($V_{DD}$).

The output terminal of the inverter 50 is connected to the gate terminal of these PMOS transistors 46, 48. The precharge control signal input terminal 28 is connected to the input terminal of the inverter 50.

Figure 3:
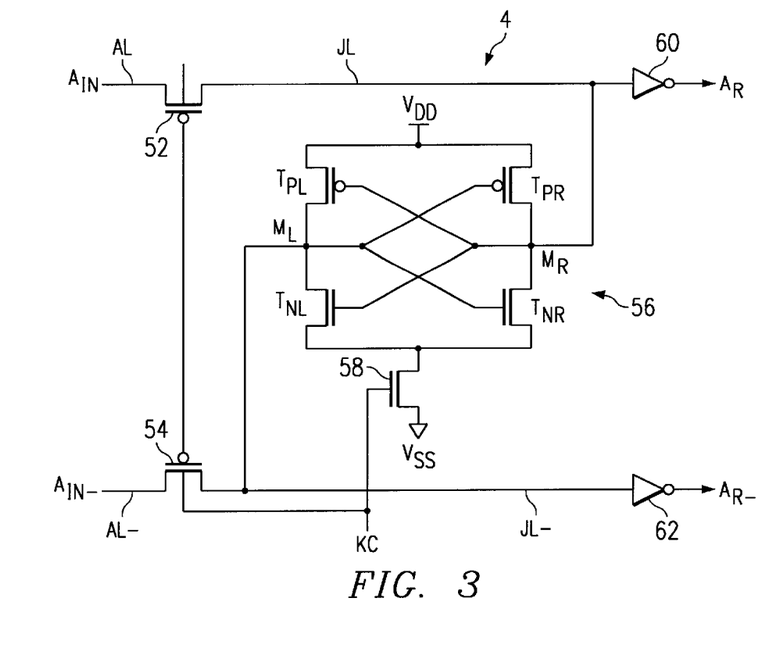
FIG. 3 is a circuit diagram showing a circuit construction example of a receiver in an application example.

A circuit diagram for the receiver 4 is shown in FIG. 3. This receiver 4 has transfer gates 52, 54 that are connected between the receive ends of the bus lines (AL, AL__) and the internal lines (JL, JL__), and a binary comparator differential amplifier 56 that is connected to the internal lines (JL, JL__). When the drive timing signal (KC) from the timing circuit 6 is activated at the H level, at the same time that the transfer gates 52, 54 that are made up of PMOS transistors are switched OFF and are electrically blocked from the bus lines AL, AL__, the switch 58 made up of an NMOS transistor is switched ON and the differential amplifier 56 is switched on.

When the differential amplifier 56 is switched on, it detects the differential of the receive address signals (Ain, Ain__) on the internal lines (JL, JL__), and amplifies the differential so that it equals the difference between the H level and the L level of the power supply voltages ($V_{DD}$) and ($V_{SS}$).

The receive address signals (Ain, Ain__) that are amplified in this manner to the reference H level ($V_{DD}$) and the reference L level ($V_{SS}$) by means of the differential amplifier 56 are sent to a signal receiving section (not illustrated) of a later stage via the inverters 60, 62, respectively.

Next, an explanation is given in regard to the operation of the bus driver 2 of this application example based on the timing chart of FIG. 4.

During the interval the address signals (AOUT, AOUT__) is not being received, the precharge control signal (PRC) from the timing circuit 6 that is applied to the input terminal 28 is active (H level). Due to this, the output of the inverter 50 is at the L level, and the PMOS transistors 46, 48 that are the switching elements used for the precharge are each switched ON.

On the other hand, the address enable signal (AEN) from the timing circuit 6 that is applied to the input terminal 32 is inactive (H level). Due to this, the outputs of both NOR gates 26, 44 are at the L level, and both NMOS transistors 10, 12 that are the switching elements used to drive remain OFF.

Therefore, the bus lines AL, AL__) are precharged by the power supply voltage ($V_{DD}$) via the respective transistors 46, 48 that are switched ON, and held at the voltage level of ($V_{DD}$).

Because the precharge control signal (PRC) is at the H level, at the switching control circuits 14, 34, the respective NMOS transistors 18, 38 are switched ON, the respective nodes (Nc, Nd) are driven to the voltage of the power supply voltage ($V_{SS}$), in other words, the L level, and the output of both inverters 20, 40 become the H level, respectively.

When the address signal (AIN) of the pertinent bit is input to the address input terminal 30, as shown in (B), (C) of FIG. 4, immediately afterwards, the precharge control signal (PRC) assumes the non-active state (L level), and conversely, the address enable signal (AEN__) assumes the active state (L level).

When the precharge control signal (PRC) becomes the L level, the output of the inverter 50 becomes the H level, and the PMOS transistors 46, 48 used for the precharge are turned OFF. Also, the NMOS transistors 18, 38 within the switching control circuits 14, 34 are turned OFF. However, the respective nodes (Nc, Nd), due to the operation of the capacitors C1, C2, are held at the potential of ($V_{SS}$) (L level), and the output of both inverters 20, 40 are held at the H level.

When the logic value of the input address signal (AIN) is a "1" (H level), with the output of the inverter 22 at the L level ☐ the output of the NAND gate 24 at the H level and the output (GS) of the NOR gate 26 at the L level, the NMOS transistor 10 used for the drive remains OFF. Due to this, the voltage of the bus line AL is held at the level of ($V_{DD}$), and the address signal (AOUT) is transmitted and output at the voltage level of ($V_{DD}$).

On the other hand, the output of (Ain) becomes H level ☐ NAND gate 42 becomes L level, and as shown in (D) of FIG. 4, the output (GS__) of the NOR gate 44 rises to the H level, and the NMOS transistor 12 used for driving is turned ON.

Figure 4A:
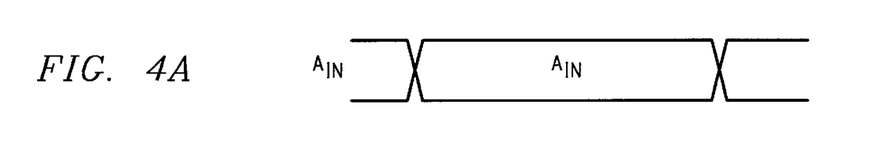
FIG. 4 is a timing chart-showing the waveform of the signal for each section for the purpose of explaining the operation of an application example.
Figure 4B:
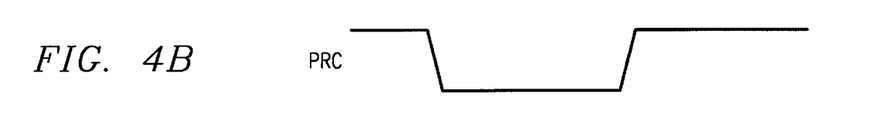
Figure 4C:
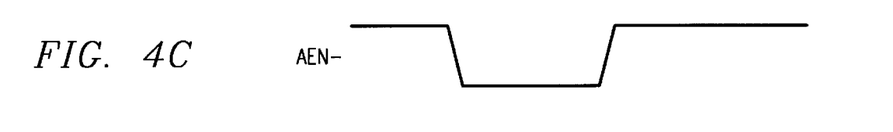
Figure 4D:
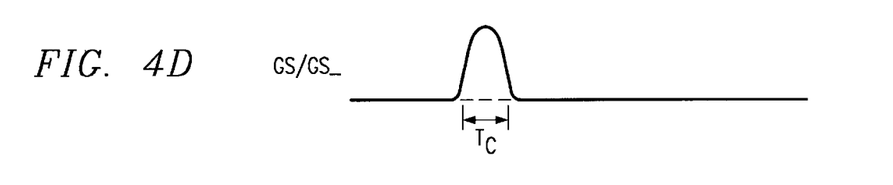
Figure 4E:
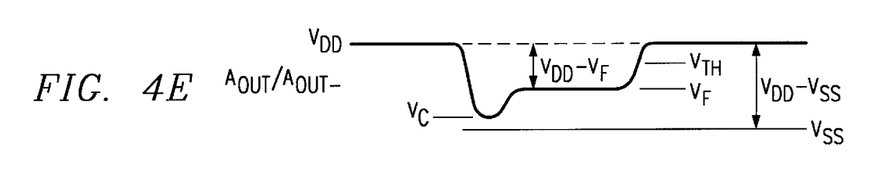

When this is done, the bus line AL__ is connected to a terminal at the power supply voltage ($V_{SS}$) through the NMOS transistor 12 which is switched ON, the electrical charge on the bus line AL__ is discharged, and as shown in FIG. 4(E), the potential of the bus line AL__ drops rapidly.

Then, when the potential of the bus line AL__ drops to the prescribed voltage level (Vc), in the switching control circuit 34, the PMOS transistor 36 is turned on, and the node (Nd) becomes the voltage level of ($V_{DD}$). The voltage level ($V_{DD}$) at node (Nd) is maintained with the aid of capacitor C2. Due to this, the output of the inverter 40 becomes an L level ☐ the output of the NAND gate 42 [becomes] the H level, the output (GS__) of the NOR gate 44 drops to the L level, and the NMOS transistor 12 returns to the OFF state.

Figure 4F:
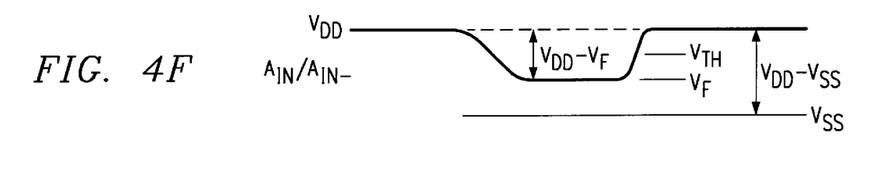
Figure 4G:
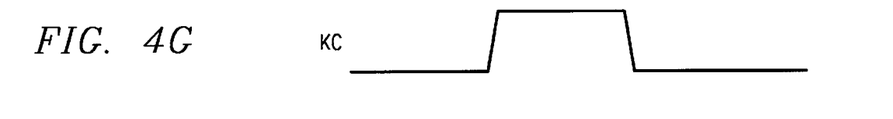
Figure 4H:
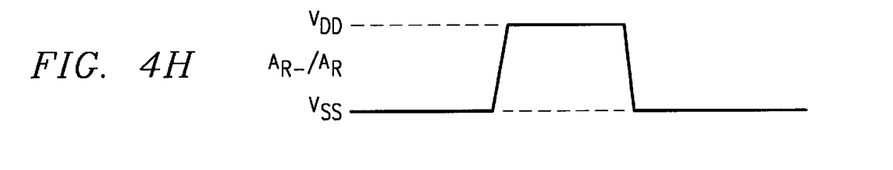

When the NMOS transistor 12 is turned OFF, the bus line AL__ stops discharging, and over the entire bus line AL__, the potential between the transmit end (near end) and the receive end (far end), in particular, is equalized. Due to this, at the near end (AOUT_), as shown in FIG. 4(E), the potential rises more than the minimum point (Vc). On the other hand, at the far end (Ain_), as shown in FIG. 4(F), the potential drops further. Also, both potentials are stabilized by the averaging voltage level (VF) until they are equivalent.

Here, this average voltage level (VF) is a level that is lower than the threshold value (VTH) for the binary detection amplification in the receiver 4 of the receive end. By this means, at the receiver 4, the logic value for the address signal (Ain_) on the bus line AL_ can be recognized as a "0" (L level).

The voltage level (VF) or the amplitude ($V_{DD}$-VF) for the logic L level in the transmit address signal can be adjusted arbitrarily by means of controlling the period (Tc), in other words, the switching state of the NMOS transistor 10, 12 so that the output (GS), (GS_) of the NOR gate 26, 44 goes to the H level in the pulse condition. Specifically, for example, this can be adjusted arbitrarily by changing the size of the NMOS transistor 10, 12.

The shorter the above-mentioned period (Tc) is made, the smaller the potential drop at the near end of the bus line AL or AL_ that transmits the address signal for the logic L level, the higher the minimum point (Vc), and the higher the constant voltage level (VF). Conversely, the longer the above-mentioned period (Tc) is made, the larger the potential drop at the near end of the bus line AL or AL_ that transmits the address signal for the logic L level, the lower the smallest point (Vc), and the lower the constant voltage level (VF).

In the bus driver 2 of this application example, by setting this period (Tc) to a value that is sufficiently smaller than the pulse time period that is regulated by the address enable signal (AEN_) or the precharge control signal (PRC), the voltage (VF) for the L level in the transmit address signal (AOUT, AOUT_) (Ain, Ain_) is made higher than the power supply voltage ($V_{SS}$), the amplitude ($V_{DD}$-VF) of the transmit address signal is made smaller than the full amplitude ($V_{DD}$-$V_{SS}$), and can be the necessary minimum magnitude.

The power that is consumed in this bus driver 2 is mainly a factor of the operating (discharge) current when the NMOS transistors 10, 12 used for the driver are turned on. However, as mentioned above, because the period (Tc) is short, and the amplitude ($V_{DD}$-VF) for the transmit address signal (AOUT, AOUT_) is small, the power consumption is greatly reduced.

Also, if the amplitude ($V_{DD}$-VF) for the transmit address signal (AOUT, AOUT_) (Ain, Ain_) is small, a short pulse period is sufficient, and the transmission delay time can also be compressed. Therefore, in the memory device of this application example, the access speed can be increased.

Figure 5:
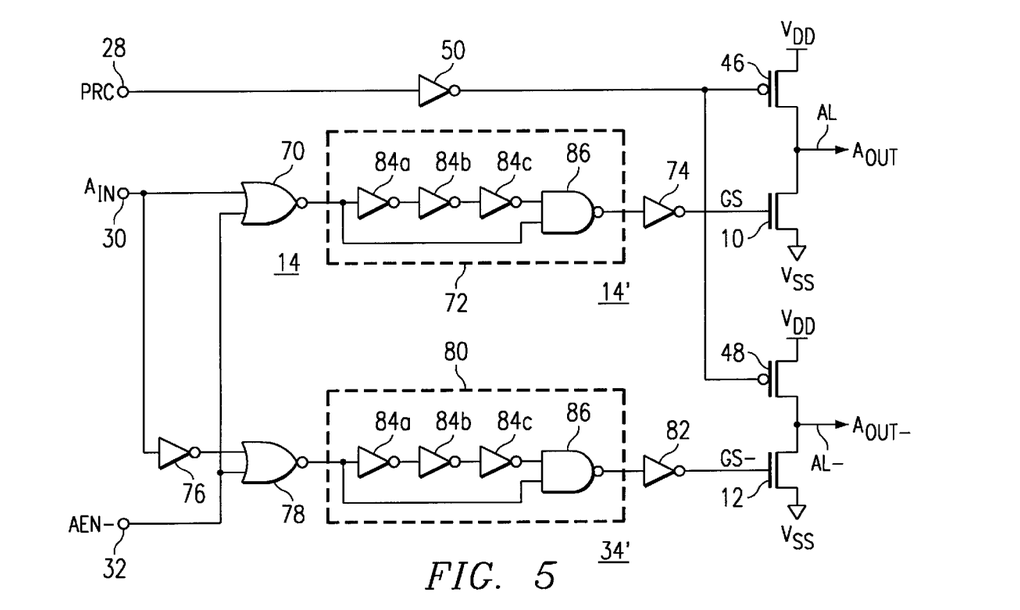
FIG. 5 is a circuit diagram showing the circuit construction of a bus driver according to another application example.

A circuit construction for a bus driver 2 according to Application Example 2 is shown in FIG. 5.

In this application example, each of the sections comprising the NMOS transistors 10, 12 used for the driver, the PMOS transistors 46, 48 used for the precharge, and the inverter 50 used for the precharge control are the same as those of the above-mentioned Application Example 1. The differences are in the circuit construction and operation of the switching control circuits 14', 34'.

Specifically, in the switching control circuit 14', the NOR gate 70, the one-shot circuit 72, and the inverter 74 are cascade connected. In the switching control circuit 34', the inverter 76, the NOR gate 78, the one-shot circuit 80, and the inverter 82 are cascade connected. The one-shot circuits 72, 80 are constructed of multiple units, for example, three inverters 84a, 84b, 84c and the NAND gate 86.

In this type of construction, when the logic value for the input address signal (AIN) is a "1" (H level), in the switching control circuit 14', the output (GS) of the inverter 74 remains at the L level, and the NMOS transistor 10 used for the drive is held in the OFF state. Therefore, the address signal (AOUT) is output on the bus line AL at the H level of ($V_{DD}$).

On the other hand, at the switching control circuit 34', the output of the inverter 76 becomes an L level ☐ the output of the NOR date 78 becomes an H level, and in reaction to this, a voltage (pulse) that is activated at the L level for just the prescribed time (TM) is obtained from the output terminal of the one-shot circuit 80. The output (GS_) of inverter 82 changes to H level corresponding to the pulse on the L level, and driving NMOS transistor 12 is turned on.

When the logic value of the input address signal (AIN) is a "0" (L level), the operation is reversed between the switching control circuits 14', 34', between the NMOS transistors 10, 12 used for the drive, and between the bus lines (AL, AL_) and the like.

The period (Tc') in this application example has a technical meaning equivalent to the period (Tc) in the above-mentioned Application Example 1, and is regulated by means of the output pulse width (TM) of the one-shot circuit 80. The output pulse width of the one-shot circuit 80 is adjusted arbitrarily by means of the number of units (number of stages) of the inverter 84.

In this manner, in this Application Example 2, without monitoring the potential of the bus lines AL, AL_, by means of turning ON either one of the driving NMOS transistors 10, 12 for just the predetermined constant period (Tc') within the switching control circuits 14', 34', the bus lines (AL, AL_are driven at a small magnitude ($V_{DD}$-VF) in the same manner as in the above-mentioned Application Example 1, and a reduction of the power consumption and an increase in the transmission speed can be realized.

In the above-mentioned application example, the switching element used for the precharge is constructed by the PMOS transistors 46, 48, and the timing between the precharge control signal (PRC) and the address enable signal (AEN_) is adjusted (FIG. 4(B), (C)) so that these PMOS transistors 46, 48 and the NMOS transistors 10, 12 used for driving are not turned ON at the same time. By this means, punchthrough current is prevented, and the protection of the elements and the lowering by yet another level of power consumption are accomplished.

It must be noted that the operating current and power consumption are inferior but this design allows a simplified circuit and a common precharge control signal (PRC) and address enable signal (AEN_), in other words, the precharge control signal (PRC) can be used for the address enable signal (AEN_).

Also, the switching elements used for the precharge can be interchanged with resistive elements used for the bias. In that case, by fixedly connecting the gate terminals of the PMOS transistors 46, 48 to the power supply voltage ($V_{SS}$), both transistors 46, 48 can be used as resistive elements.

Also, the above-mentioned application example is a construction wherein the driving switching elements (NMOS transistors 10, 12) are connected between the transmission end of the bus lines (AL, AL_) and terminals at the power supply voltage ($V_{SS}$) at the L level.

However, it can also be made a construction wherein the driving switching elements (normally, the PMOS transistors) are connected between the transmission end of the bus lines (AL, AL_) and the terminals at the power supply voltage ($V_{DD}$) at the H level. In this case, switching elements and resistive elements used for the precharge and the bias are connected between the transmission end of the bus lines (AL, AL_) and a terminal at the power supply voltage ($V_{SS}$) at the L level.

The circuit construction (FIG. 3) for the receiver 4 is only one example for the above-mentioned application example, and other receiver circuits can be used.

The above-mentioned application examples are devices related to a bus driver for the purpose of transmitting an address signal. However, the present invention is also applicable to drives such as control buses or data buses, and is applicable to signal lines driven for the purpose of transmitting arbitrary digital signals or binary signals. Also, the above-mentioned capacitors C1, C2 can be constructed using parasitic capacitance.

As explained above, according to the signal line driver of the present invention, since this design drives a signal line at the minimum necessary amplitude in order to transmit a binary signal, the power consumption can be reduced and the transmission delay time can be shortened.

What is claimed is:

1. Signal line driver that electrically drives a first and second signal line complementarily in order to transmit one binary signal, comprising a first and second bias means that hold the first and second signal line respectively at a first voltage level in the interval the binary signal is not being transmitted, a first and second switching means that connect between the first and second signal lines respectively and a power supply voltage terminal that supplies a second voltage level, and a switch control means that holds the first and second switching means in the OFF condition in the interval the binary signal is not being transmitted, switches one of the first or second switching means to the ON condition in response to the logic value of the binary signal when the binary signal is being transmitted and holds the other in the OFF condition, and returns the switching means to the OFF condition when the voltage of the signal line that is connected to the switching means reaches a prescribed voltage level.

2. Signal line driver claimed in claim 1 wherein the bias means has a precharging switching means that is connected between each of the signal lines and the power supply voltage terminal that supplies the first voltage level, and a precharge control means that holds the precharging switching means in the ON condition in the interval the binary signal is not being transmitted, and holds the precharging switching means in the OFF condition when the binary signal is being transmitted.

3. Signal line driver that electrically drives a signal line for the purpose of transmitting a binary signal in a pulse waveform, along a bus comprising a bias means that holds the signal line at a first voltage level in the interval the binary signal is not being transmitted, a switching means that is connected between the signal line and a power supply voltage terminal that supplies a second voltage level, and a switch control means that holds the switching means in the OFF condition in the interval the binary signal is not being transmitted, conditionally switches the switching means to the ON condition in response to the logic value of the binary signal when the binary signal is being transmitted, and returns the switching means to the OFF condition when a prescribed period that is shorter than the pulse period has elapsed wherein the length of the prescribed period determines a potential drop at a near end of said bus.

4. The signal line driver of claim 3 wherein the shorter said length of said prescribed period, the smaller potential drop at said near end of said bus.

5. The signal line driver of claim 4 wherein said length of said period also controls a minimum point of said signal and an amplitude of a constant voltage level on said bus.

6. The signal line driver of claim 3 wherein said length of said period also controls a minimum point of said signal and an amplitude of a constant voltage level on said bus.

7. Signal line driver that electrically drives a first and second signal line complementarily for the purpose of transmitting a binary signal of a pulse waveform, comprising a first and second switching means that hold the first and second signal lines respectively at a first voltage level in the interval the binary signal is not being transmitted, a first and second switching means that are connected between the first and second signal lines respectively and a power supply voltage terminal that supplies a second voltage level, and a control means that holds the first and second switching means in the OFF condition in the interval the binary signal is not being transmitted, switches one of the first or second switching means to the ON condition in response to the logic value of the binary signal when the binary signal is being transmitted and holds the other in the OFF condition, and returns the switching means to the OFF condition when a prescribed period that is shorter than the pulse period has elapsed.

8. Signal line driver claimed in claim 7 wherein the bias means has a precharging switching means that is connected between each of the signal lines and the power supply voltage terminal that supplies the first voltage level, and a precharge control means that holds the precharging switching means in the ON condition in the interval the binary signal is not being transmitted, and holds the precharging switching means in the OFF condition when the binary signal is being transmitted.

9. Signal line driver that electrically drives a signal line for the purpose of transmitting a binary signal, comprising: a bias means that holds the signal line at a first voltage level in the interval the binary signal is not being transmitted, a switching means that is connected between the signal line and a power supply voltage terminal that supplies a second voltage level, and a switching control means that holds the switching means in the OFF condition in the interval the binary signal is not being transmitted, conditionally switches the switching means to the ON condition in response to the logic value of the binary signal when the binary signal is being transmitted, and returns the switching means to the OFF condition when the voltage of the signal line reaches a prescribed voltage level, wherein the bias means has a precharging switching means that is connected between each of the signal lines and the power supply voltage terminal that supplies the first voltage level, and a precharge control means that holds the precharging switching means in the ON condition in the interval the binary signal is not being transmitted, and holds the precharging switching means in the OFF condition when the binary signal is being transmitted.

10. Signal line driver that electrically drives a signal line for the purpose of transmitting a binary signal in a pulse waveform, comprising a bias means that holds the signal line at a first voltage level in the interval the binary signal is not being transmitted, a switching means that is connected between the signal line and a power supply voltage terminal that supplies a second voltage level, and a switch control means that holds the switching means in the OFF condition in the interval the binary signal is not being transmitted, conditionally switches the switching means to the ON condition in response to the logic value of the binary signal when the binary signal is being transmitted, and returns the switching means to the OFF condition when a prescribed period that is shorter than the pulse period has elapsed wherein the bias means has a precharging switching means that is connected between each of the signal lines and the power supply voltage terminal that supplies the first voltage level, and a precharge control means that holds the precharging switching means in the ON condition in the interval the binary signal is not being transmitted, and holds the precharging switching means in the OFF condition when the binary signal is being transmitted.

* * * * *